(12) United States Patent
Kusano

(10) Patent No.: US 12,378,338 B2
(45) Date of Patent: Aug. 5, 2025

(54) METHOD FOR PRODUCING PELLETS

(71) Applicant: AGC Inc., Tokyo (JP)

(72) Inventor: Hiromitsu Kusano, Tokyo (JP)

(73) Assignee: AGC Inc., Tokyo (JP)

( * ) Notice: Subject to any disclaimer, the term of this patent is extended or adjusted under 35 U.S.C. 154(b) by 1069 days.

(21) Appl. No.: 17/194,998

(22) Filed: Mar. 8, 2021

(65) Prior Publication Data

US 2021/0198397 A1 Jul. 1, 2021

Related U.S. Application Data

(63) Continuation of application No. PCT/JP2019/035752, filed on Sep. 11, 2019.

(30) Foreign Application Priority Data

Sep. 14, 2018 (JP) .................. 2018-172344

(51) Int. Cl.
B29C 48/00 (2019.01)
B29B 9/06 (2006.01)
(Continued)

(52) U.S. Cl.
CPC ............ *C08F 214/182* (2013.01); *B29B 9/06* (2013.01); *C08F 216/1408* (2013.01); *C08F 216/1475* (2020.02); *C08J 3/12* (2013.01); *C08J 5/2237* (2013.01); *C25B 13/08* (2013.01); *B29K 2027/16* (2013.01); *B29K 2027/18* (2013.01); *C08J 2327/12* (2013.01); *C08J 2333/16* (2013.01)

(58) Field of Classification Search
CPC ................ B29C 4/0022; B29B 9/06
See application file for complete search history.

(56) References Cited

U.S. PATENT DOCUMENTS

2013/0209900 A1* 8/2013 Wakabayashi ...... H01M 4/8825
429/408

FOREIGN PATENT DOCUMENTS

WO WO2005/012473 * 2/2005
WO WO 2013/115072 A1 8/2013

OTHER PUBLICATIONS

International Search Report issued Nov. 5, 2019 in PCT/JP2019/035752 filed Sep. 11, 2019, 2 pages.

* cited by examiner

*Primary Examiner* — Edmund H Lee
(74) *Attorney, Agent, or Firm* — Oblon, McClelland, Maier & Neustadt, L.L.P.

(57) ABSTRACT

To provide a method for producing pellets from which an ion exchange membrane excellent in stability of the electrolysis voltage can be formed, pellets, and an ion exchange membrane.

The method for producing pellets of the present invention is a method for producing pellets, which comprises extruding a melt containing a fluorinated polymer having groups convertible to ion exchange groups from a die of a melt-extruder to obtain a strand containing the fluorinated polymer, and cutting the strand to obtain pellets containing the fluorinated polymer, wherein the temperature of the die when the melt containing the fluorinated polymer is extruded from the die is less than 200° C., and when the groups convertible to ion exchange groups of the fluorinated polymer are converted to ion exchange groups, the ion exchange capacity of the resulting fluorinated polymer is at least 1.1 milliequivalent/g dry resin.

12 Claims, 1 Drawing Sheet

(51) Int. Cl.
*C08F 214/18* (2006.01)
*C08F 216/14* (2006.01)
*C08J 3/12* (2006.01)
*C08J 5/22* (2006.01)
*C25B 13/08* (2006.01)
*B29K 27/00* (2006.01)
*B29K 27/18* (2006.01)

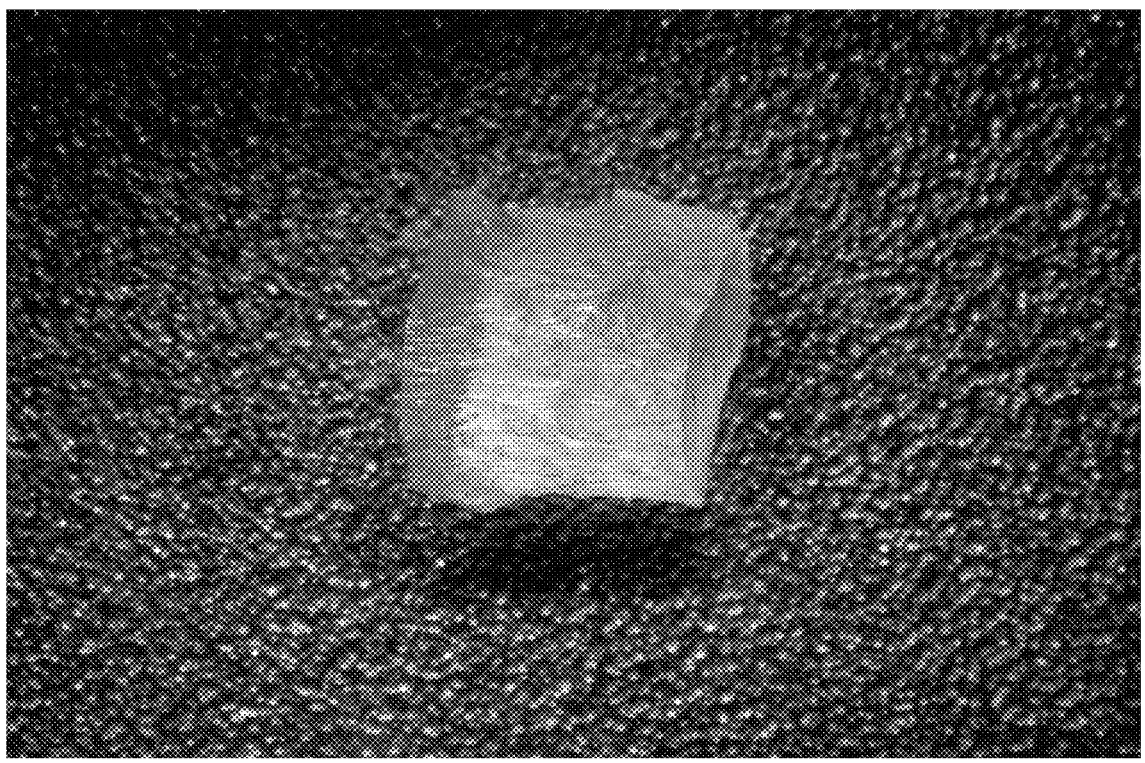

METHOD FOR PRODUCING PELLETS

TECHNICAL FIELD

The present invention relates to a method for producing pellets, pellets and an ion exchange membrane.

BACKGROUND ART

In various batteries, in an electrolysis process and in a process for separating e.g. ions, an ion exchange membrane containing a fluorinated polymer having ion exchange groups is used.

As a method for producing an ion exchange membrane containing a fluorinated polymer, a method of using as a raw material pellets of a fluorinated polymer having ion exchange groups or groups convertible to ion exchange groups has been known (Patent Document 1).

PRIOR ART DOCUMENTS

Patent Document

Patent Document 1: WO2013/115072

DISCLOSURE OF INVENTION

Technical Problem

In recent years, an electrolysis apparatus comprising an ion exchange membrane is required to have excellent stability of the electrolysis voltage (small variation width of the electrolysis voltage) in view of production efficiency. The present inventor has applied an ion exchange membrane obtained by using the pellets of the fluorinated polymer as disclosed in Patent Document 1 to an electrolysis apparatus, it was found that the variation width of the electrolysis voltage is so large as to be improved.

Under these circumstances, the object of the present invention is to provide a method for producing pellets from which an ion exchange membrane excellent in stability of the electrolysis voltage can be obtained, pellets, and an ion exchange membrane.

Solution to Problem

The present inventor has conducted extensive studies to achieve the above object and as a result, found that in production of pellets containing a fluorinated polymer using a fluorinated polymer having groups convertible to ion exchange groups, the desired effects are obtained by adjusting the ion exchange capacity when the groups convertible to ion exchange groups are converted to ion exchange groups to be at least 1.1 milliequivalent/g dry resin (hereinafter sometimes referred to as meq/g resin) and by adjusting the temperature of a die when the melt of the fluorinated polymer is extruded from the die of a melt-extruder to be less than 200° C., and accomplished the present invention.

The present invention provides the following.

[1] A method for producing pellets, which comprises extruding a melt containing a fluorinated polymer having groups convertible to ion exchange groups from a die of a melt-extruder to obtain a strand containing the fluorinated polymer, and cutting the strand to obtain pellets containing the fluorinated polymer, wherein the temperature of the die when the melt containing the fluorinated polymer is extruded from the die is less than 200° C., and when the groups convertible to ion exchange groups of the fluorinated polymer are converted to ion exchange groups, the ion exchange capacity of the resulting fluorinated polymer is at least 1.1 meq/g resin.

[2] The production method according to [1], wherein the strand is cut to obtain pellets containing the fluorinated polymer having a light transmittance of from 30 to 60%.

[3] The production method according to [1] or [2], wherein when the groups convertible to ion exchange groups of the fluorinated polymer are converted to ion exchange groups, the ion exchange capacity of the resulting fluorinated polymer is at most 2.00 milliequivalent/g dry resin.

[4] The production method according to any one of [1] to [3], wherein the groups convertible to ion exchange groups are groups convertible to carboxylic acid functional groups or groups convertible to sulfonic acid functional groups.

[5] The production method according to any one of [1] to [4], wherein the fluorinated polymer having groups convertible to ion exchange groups is a copolymer of a fluorinated olefin and a monomer represented by the following formula (1):

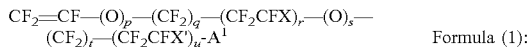

Formula (1):

wherein X and X' are each independently a fluorine atom or a trifluoromethyl group, $A^1$ is a group convertible to a carboxylic acid functional group, p is an integer of 0 or 1, q is an integer of from 0 to 12, r is an integer of from 0 to 3, s is an integer of from 0 or 1, t is an integer of from 0 to 12, and u is an integer of from 0 to 3, provided that $1 \leq p+s$, and $1 \leq r+u$.

[6] The production method according to any one of [1] to [4], wherein the fluorinated polymer having groups convertible to ion exchange groups is a copolymer of a fluorinated olefin and a monomer represented by the following formula (2):

$$CF_2=CF-L-(A)_n$$ Formula (2):

wherein L is a n+1 valent perfluorinated hydrocarbon group which may contain an oxygen atom, n is 1 or 2, and A is a group convertible to a sulfonic acid functional group.

[7] The production method according to [6], wherein the monomer represented by the formula (2) is a compound represented by the formula (2-1), a compound represented by the formula (2-2) or a compound represented by the formula (2-3):

$$CF_2=CF-O-R^{f1}-A$$ Formula (2-1):

$$CF_2=CF-R^{f1}-A$$ Formula (2-2):

Formula (2-3):

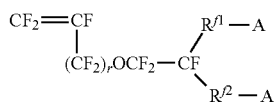

wherein $R^{f1}$ is a perfluoroalkylene group which may contain an oxygen atom between carbon atoms, $R^{f2}$ is a single bond or a perfluoroalkylene group which may contain an oxygen atom between carbon atoms, and A is as defined for the formula (2).

[8] The production method according to any one of [1] to [7], wherein the pellets are used for producing an ion-exchange membrane.

[9] Pellets containing a fluorinated polymer having groups convertible to ion exchange groups,
  wherein when the groups convertible to ion exchange groups of the fluorinated polymer are converted to ion exchange groups, the ion exchange capacity of the resulting fluorinated polymer is at least 1.1 meq/g resin, and
  the pellets have a light transmittance of from 30 to 60%.

[10] The pellets according to [9], wherein the groups convertible to ion exchange groups are groups convertible to carboxylic acid functional groups or groups convertible to sulfonic acid functional groups.

[11] The pellets according to [9] or [10], to be used for producing an ion exchange membrane.

[12] An ion exchange membrane formed by using the pellets as defined in any one of [9] to [11].

[13] The ion exchange membrane according to [12], which has a membrane thickness of from 30 to 180 μm.

[14] The ion exchange membrane according to or [13], to be used for electrolysis of aqueous alkali chloride.

Advantageous Effects of Invention

According to the present invention, it is possible to provide a method for producing pellets from which an ion exchange membrane excellent in stability of electrolysis voltage can be formed, by such a mechanism that a pressure variation at the time of film formation for forming an ion exchange membrane is suppressed, whereby the resulting ion exchange membrane is excellent in film thickness uniformity and suppresses a deviation in the electrolysis voltage when applied to an electrolysis apparatus, and to provide pellets, and an ion exchange membrane.

BRIEF DESCRIPTION OF DRAWINGS

FIG. 1 is a photograph (a magnification of 30) of the outer appearance of a pellet obtained in Example 1.

DESCRIPTION OF EMBODIMENTS

The following terms used herein have the following meanings.

An "ion exchange group" is a group at least partly containing an ion which can be exchanged for another ion, such as a sulfonic acid functional group or a carboxylic acid functional group, which will be described below.

A "sulfonic acid functional group" means a sulfonic acid group (—$SO_3H$) or a sulfonate group (—$SO_3M^2$ wherein $M^2$ is an alkali metal or a quaternary ammonium cation).

A "carboxylic acid functional group" means a carboxylic acid group (—COOH) or a carboxylate group (—$COOM^1$ wherein $M^1$ is an alkali metal or a quaternary ammonium cation).

A "precursor membrane" is a membrane comprising a polymer having groups convertible to ion exchange groups.

A "group convertible to an ion exchange group" means a group which can be converted to an ion exchange group by treatments such as hydrolysis, conversion to an acid form, and salt conversion to other metal cation.

A "group convertible to a sulfonic acid functional group" means a group which can be converted to a sulfonic acid functional group by treatments such as hydrolysis and conversion to an acid form.

A "group convertible to a carboxylic acid functional group" means a group which can be converted to a carboxylic acid functional group by treatments such as hydrolysis and conversion to an acid form.

A "perfluorinated hydrocarbon group" means a hydrocarbon group in which all the hydrogen atoms have been replaced by fluorine atoms.

An "aliphatic perfluorinated hydrocarbon group" means an aliphatic hydrocarbon group in which all the hydrogen atoms have been replaced by fluorine atoms.

A "unit" in a polymer means an atomic group derived from 1 molecule of a monomer by polymerization. A unit may be an atomic group directly formed by a polymerization reaction, or may be an atomic group having a partially different structure obtained by polymerization followed by partial structural conversion.

A "reinforcing material" means a material used to improve the strength of an ion exchange membrane. The reinforcing material is preferably a derivative of a reinforcing fabric.

A "reinforcing fabric" means a fabric used as a raw material of a reinforcing material used to improve the strength of an ion exchange membrane.

"Reinforcing threads" are threads constituting a reinforcing fabric which do not dissolve in an operating apparatus containing an ion exchange membrane. The "reinforcing threads" are preferably made of a material which will not dissolve when the reinforcing fabric is immersed in an aqueous alkaline solution (such as 32 mass % aqueous sodium hydroxide).

"Sacrificial threads" are threads constituting a reinforcing fabric which at least partly dissolve in an operating apparatus containing an ion exchange membrane. The "sacrificial threads" are preferably made of a material which dissolves in an aqueous alkaline solution when the reinforcing fabric is immersed in the aqueous alkaline solution.

A numerical range expressed by using "to" includes the figures before and after "to" as the lower limit and the upper limit. Further, in a case where the units for the lower limit and the upper limit are the same, the unit for the low limit may sometimes be omitted.

[Method for Producing Pellets]

The method for producing pellets of the present invention (hereinafter sometimes referred to as the present production method) is a method for producing pellets, which comprises extruding a melt containing a fluorinated polymer having groups convertible to ion exchange groups (hereinafter sometimes referred to as fluorinated polymer (I')) from a die of a melt-extruder to obtain a strand containing the fluorinated polymer (I'), and cutting the strand to obtain pellets containing the fluorinated polymer (I').

In the present production method, the temperature of the die when the melt containing the fluorinated polymer (I') is extruded from the die is less than 200° C.

Further, in the present production method, when the groups convertible to ion exchange groups of the fluorinated polymer (I') are converted to ion exchange groups, the ion exchange capacity of the resulting fluorinated polymer (hereinafter sometimes referred to as fluorinated polymer (I)) is at least 1.1 meq/g resin.

According to the present production method, pellets from which an ion exchange membrane excellent in stability of the electrolysis voltage can be formed are obtained. The reason has not yet been understood in detail but is estimated to be as follows. One of the causes of the deviation in the electrolysis voltage may be non-uniformity of the membrane thickness of the ion exchange membrane. Such non-uniformity of the membrane thickness of the ion exchange membrane is considered to be due to aggregation of pellets containing the fluorinated polymer (I') at the time of production of a film-form ion exchange membrane using the pellets, thus increasing a pressure variation at the time of film formation. Further, the aggregation of the pellets is remarkable when a fluorinated polymer capable of being converted to a fluorinated polymer having a high ion exchange capacity by converting the groups convertible to ion exchange groups to ion exchange groups, is used as the raw material.

The present inventor has found that such a problem can be solved by lowering the die temperature when the melt containing the fluorinated polymer (I') is extruded from the die, whereby melt fracture occurs and the surface of the strand (pellets) is thereby roughened (specifically, a plurality of grooves are formed on the surface of the pellets), thus suppressing aggregation of the pellets. It is considered that by such a mechanism, the pressure deviation at the time of film formation is suppressed, whereby an ion exchange membrane excellent in the uniformity of the membrane thickness is obtained, and the deviation in the electrolysis voltage can be suppressed when such an ion exchange membrane is applied to an electrolysis apparatus.

Now, an example of the present production method will be described.

First, a fluorinated polymer having groups convertible to ion exchange groups is supplied to a melt-extruder, to obtain a melt of the fluorinated polymer.

As the melt-extruder, a known apparatus may be used, and specifically, a single screw extruder, a twin screw extruder or a tandem extruder may be mentioned.

The melting temperature of the fluorinated polymer (I') is preferably from 150 to 350° C., particularly preferably from 200 to 300° C.

Then, the melt of the fluorinated polymer (I') is extruded from the die at the tip of the melt-extruder and cooled to obtain a strand containing the fluorinated polymer (I'), and the strand is cut into a predetermined size to obtain pellets containing the fluorinated polymer (I').

In this example of the present production method, so-called strand cut pellets are mentioned, and underwater cut pellets, hot cut pellets, etc. may also be mentioned.

The temperature of the die when the melt containing the fluorinated polymer (I') is extruded from the die (hereinafter sometimes referred to simply as die temperature) is less than 200° C., and in view of more excellent stability of the electrolysis voltage, preferably at most 190° C., more preferably at most 170° C., particularly preferably at most 150° C., most preferably at most 145° C.

The die temperature is preferably at least 140° C., more preferably at least 142° C., whereby the melt of the fluorinated polymer (I') will readily be extruded from the die.

Particularly in a case where the ion exchange capacity of a fluorinated polymer obtained by converting the groups convertible to ion exchange groups of the fluorinated polymer (I') converted to ion exchange groups (that is the fluorinated polymer (I)) is at least 1.2 meq/g resin, in view of more excellent stability of the electrolysis voltage and more excellent electrolysis efficiency, the die temperature is preferably at least 140° C. and less than 200° C., more preferably from 140 to 150° C., particularly preferably from 140 to 145° C.

The shape of the pellets obtained by the present production method is not particularly limited and may be any shape, such as a spherical shape (including elliptical) and a columnar shape (such as cylindrical).

The size of the pellets obtained by the present production method is not particularly limited and for example, in a case where the pellets are cylindrical, the diameter is preferably from 2 to 3 mm and the length is preferably from 2 to 3 mm.

The surface of the pellets (strand) obtained by the present production method preferably has a plurality of grooves formed, whereby aggregation of the pellets is suppressed.

The grooves on the surface of the pellets may be formed on the whole surface of the pellets but are formed preferably only on the side surfaces of the pellets (surfaces other than the strand cut surface).

The grooves on the surface of the pellets are formed preferably along the direction perpendicular to the cut surfaces of the pellets (the strand flow direction).

In the present production method, after the strand is cut, a roughening treatment to roughen the surface of the pellets may be carried out. By such treatment, the surface of the pellets is more roughened and aggregation of the pellets is more suppressed, whereby an ion exchange membrane more excellent in the stability of the electrolysis voltage can be obtained.

As a specific example of the roughening treatment method, a method of stirring the pellets by a mixer (for example, a V blender) may be mentioned.

The pellets obtained by the present production method are used preferably for production of an ion exchange membrane. Specific examples of the application of the ion exchange membrane will be described hereinafter.

[Fluorinated Polymer (I')]

The fluorinated polymer (I') used in the present production method is a fluorinated polymer having groups convertible to ion exchange groups. The groups convertible to ion exchange groups may be preferably groups convertible to carboxylic acid functional groups or groups convertible to sulfonic acid functional groups.

When the groups convertible to ion exchange groups of the fluorinated polymer (I') are converted to ion exchange groups, the resulting fluorinated polymer (that is the fluorinated polymer (I)) has an ion exchange capacity of at least 1.1 meq/g resin, and with a view to lowering the electrolysis voltage of the apparatus, particularly preferably at least 1.20 meq/g resin, and in view of more excellent strength of the ion exchange membrane, preferably at most 2.00 meq/g resin, particularly preferably at most 1.90 meq/g resin.

The fluorinated polymer (I) for the ion exchange capacity measurement is obtained as follows. First, a fluorinated polymer (I') after heat-treated in vacuum at 240° C. under −0.1 MPaG for 16 hours is dipped in a solution of dimethyl sulfoxide/potassium hydroxide/water=30/5.5/64.5 (mass ratio) at 95° C. for 30 minutes to hydrolyze and convert the groups convertible to ion exchange groups in the fluorinated polymer (I') to K-form ion exchange groups, and the polymer is washed with water. Then, the polymer is dipped in aqueous sodium hydroxide to convert the terminal group from K form to Na form thereby to obtain the fluorinated polymer (I) for the ion exchange capacity measurement.

The method for measuring the ion exchange capacity of the fluorinated polymer (I) thus obtained is as described in the after-described Examples.

The fluorinated polymer (I') may be used alone or in combination of two or more.

The fluorinated polymer (I') is preferably a fluorinated polymer having groups convertible to carboxylic acid functional groups (hereinafter sometimes referred to as fluorinated polymer (C')) or a fluorinated polymer having groups convertible to sulfonic acid functional groups (hereinafter sometimes referred to as fluorinated polymer (S')), whereby the effects of the present invention will further be obtained.

Now, the respective fluorinated polymers will be described in detail.

(Fluorinated Polymer (C'))

The fluorinated polymer (C') is preferably a copolymer of a fluorinated olefin and a monomer having a group convertible to a carboxylic acid functional group and a fluorine atom (hereinafter sometimes referred to as fluorinated monomer (C')), whereby the effects of the present invention will further be obtained.

As the copolymerization method, a known method such as solution polymerization, suspension polymerization or emulsion polymerization may be employed.

The fluorinated monomer (C') is not particularly limited so long as it is a compound having in its molecule at least one fluorine atom, an ethylenic double bond and a group convertible to a carboxylic acid functional group, and a known compound may be used.

The fluorinated monomer (C') is preferably a monomer represented by the following formula (1), in view of excellent monomer production cost, reactivity with other monomer and properties of the obtainable fluorinated polymer.

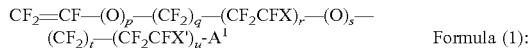

$CF_2=CF-(O)_p-(CF_2)_q-(CF_2CFX)_r-(O)_s-(CF_2)_t-(CF_2CFX')_u-A^1$     Formula (1):

In the formula (1), X and X' are each independently a fluorine atom or a trifluoromethyl group. $A^1$ is a group convertible to a carboxylic acid functional group. Specifically, —CN, —COF, —COOR$^1$ (wherein $R^1$ is a $C_{1-10}$ alkyl group), —COONR$^2$R$^3$ (wherein $R^2$ and $R^3$ are each independently a hydrogen atom or a $C_{1-10}$ alkyl group). p is an integer of 0 or 1. q is an integer of from 0 to 12. r is an integer of from 0 to 3. S is an integer of 0 or 1. t is an integer of from 0 to 12. u is an integer of from 0 to 3, provided that $1 \leq p+s$, and $1 \leq r+u$.

As specific examples of the monomer represented by the formula (1), the following compounds may be mentioned, and in view of easy production, preferred is a compound wherein p=1, q=0, r=1, s=0 to 1, t=0 to 3 and u=0 to 1.

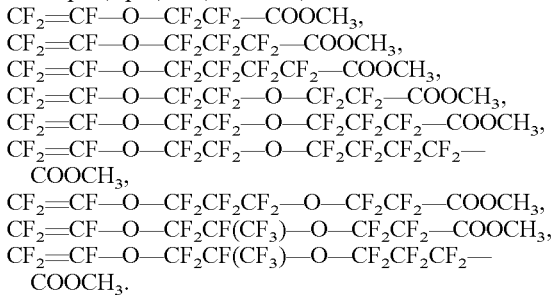

$CF_2=CF-O-CF_2CF_2-COOCH_3$,
$CF_2=CF-O-CF_2CF_2CF_2-COOCH_3$,
$CF_2=CF-O-CF_2CF_2CF_2CF_2-COOCH_3$,
$CF_2=CF-O-CF_2CF_2-O-CF_2CF_2-COOCH_3$,
$CF_2=CF-O-CF_2CF_2-O-CF_2CF_2CF_2-COOCH_3$,
$CF_2=CF-O-CF_2CF_2-O-CF_2CF_2CF_2CF_2-COOCH_3$,
$CF_2=CF-O-CF_2CF_2CF_2-O-CF_2CF_2-COOCH_3$,
$CF_2=CF-O-CF_2CF(CF_3)-O-CF_2CF_2-COOCH_3$,
$CF_2=CF-O-CF_2CF(CF_3)-O-CF_2CF_2CF_2-COOCH_3$.

The fluorinated monomer (C') may be used alone or in combination of two or more.

The fluorinated olefin may be a $C_{2-3}$ fluoroolefin having at least one fluorine atom in its molecule, specific examples of which include tetrafluoroethylene (TFE), chlorotrifluoroethylene, vinylidene fluoride, vinyl fluoride and hexafluoropropylene. Among them, in view of excellent monomer production cost, reactivity with other monomer and properties of the obtainable fluorinated polymer, TFE is particularly preferred.

The fluorinated olefin may be used alone or in combination of two or more.

For producing the fluorinated polymer (C'), in addition to the fluorinated monomer (C') and the fluorinated olefin, other monomer may further be used. Specific examples of other monomer include $CF_2=CFR^f$ ($R^f$ is a $C_{2-10}$ perfluoroalkyl group), $CF_2=CF-OR^{f1}$ ($R^{f1}$ is a $C_{1-10}$ perfluoroalkyl group), $CF_2=CFO(CF_2)_vCF=CF_2$ (v is an integer of from 1 to 3). By copolymerizing other monomer, the obtainable ion exchange membrane will have improved flexibility and mechanical strength.

The content of the units based on other monomer is preferably at most 30 mass % to all the units in the fluorinated polymer (C') with a view to maintaining the ion exchange capacity.

(Fluorinated Polymer (S'))

The fluorinated polymer (S') is preferably a copolymer of a fluorinated olefin and a monomer having a group convertible to a sulfonic acid functional group and a fluorine atom (hereinafter sometimes referred to as fluorinated monomer (S')), whereby the effects of the present invention will further be obtained.

As the copolymerization method, a known method such as solution polymerization, suspension polymerization or emulsion polymerization may be employed.

As the fluorinated olefin, the above-described olefins may be mentioned, and in view of excellent monomer production cost, reactivity with other monomer and properties of the obtainable fluorinated polymer (S'), TFE is preferred.

The fluorinated olefin may be used alone or in combination of two or more.

The fluorinated monomer (S') may be a compound having in its molecule at least one fluorine atom, an ethylenic double bond and a group convertible to a sulfonic acid functional group.

The fluorinated monomer (S') is preferably a compound represented by the following formula (2), in view of excellent monomer production cost, reactivity with other monomer and properties of the obtainable fluorinated polymer (S').

$CF_2=CF-L-(A)_n$     Formula (2):

L is a n+1 valent perfluorinated hydrocarbon group which may contain an oxygen atom.

The oxygen atom may be located at the terminal of the perfluorinated hydrocarbon group, or may be located between carbon atoms.

The n+1 valent perfluorinated hydrocarbon group has preferably at least one carbon atom, more preferably at least two carbon atoms, and preferably at most 20 carbon atoms, more preferably at most 10 carbon atoms.

L is preferably a n+1 valent perfluorinated aliphatic hydrocarbon group which may contain an oxygen atom, and is more preferably a bivalent perfluoroalkylene group wherein n=1, which may contain an oxygen atom, or a trivalent perfluorinated aliphatic hydrocarbon group wherein n=2, which may contain an oxygen atom. The bivalent perfluoroalkylene group may be either linear or branched.

n is an integer of 1 or 2.

A is a group convertible to a sulfonic acid functional group. The group convertible to a sulfonic acid functional group is preferably a functional group convertible to a sulfonic acid functional group by hydrolysis. As specific examples of the group convertible to a sulfonic acid functional group, —SO$_2$F, —SO$_2$Cl and —SO$_2$Br may be mentioned.

The compound represented by the formula (2) is preferably a compound represented by the formula (2-1), a compound represented by the formula (2-2) or a compound represented by the formula (2-3):

CF$_2$=CF—O—R$^{f1}$-A      Formula (2-1):

CF$_2$=CF—R$^{f1}$-A      Formula (2-2):

Formula (2-3):

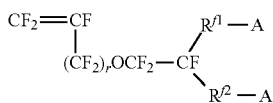

R$^{f1}$ is a perfluoroalkylene group which may contain an oxygen atom between carbon atoms. The perfluoroalkylene group preferably has at least one carbon atom, more preferably at least two carbon atoms, and preferably at most 20 carbon atoms, more preferably at most 10 carbon atoms.

R$^{f2}$ is a single bond or a perfluoroalkylene group which may contain an oxygen atom between carbon atoms. The perfluoroalkylene group preferably has at least one carbon atom, more preferably at least two carbon atoms, and preferably at most 20 carbon atoms, more preferably at most 10 carbon atoms.

r is 0 or 1.

R$^{f2}$ in the formula is a single bond or a perfluoroalkylene group which may contain an oxygen atom between carbon atoms.

A in the formulae is as defined above.

As specific examples of the compound represented by the formula (2-1), the following compounds may be mentioned. In the formula, w is an integer of from 1 to 8, and x is an integer of from 1 to 5.

CF$_2$=CF—O—(CF$_2$)$_w$—SO$_2$F

CF$_2$=CF—O—CF$_2$CF(CF$_3$)—O—(CF$_2$)$_w$—SO$_2$F

CF$_2$=CF—[O—CF$_2$CF(CF$_3$)]$_x$—SO$_2$F

As specific examples of the compound represented by the formula (2-2), the following compounds may be mentioned. In the formulae, w is an integer of from 1 to 8.

CF$_2$=CF—(CF$_2$)$_w$—SO$_2$F

CF$_2$=CF—CF$_2$—O—(CF$_2$)$_w$—SO$_2$F

The compound represented by the formula (2-3) is preferably a compound represented by the formula (2-3-1). In the formula, R$^{f3}$ is a C$_{1-6}$ linear perfluoroalkylene group, and R$^{f4}$ is a single bond or a C$_{1-6}$ linear perfluoroalkylene group which may contain an oxygen atom between carbon atoms. In the formula, r and A are as defined above.

Formula (2-3-1):

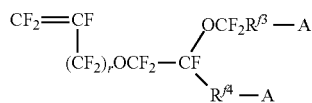

As specific examples of the compound represented by the formula (2-3-1), the following compounds may be mentioned.

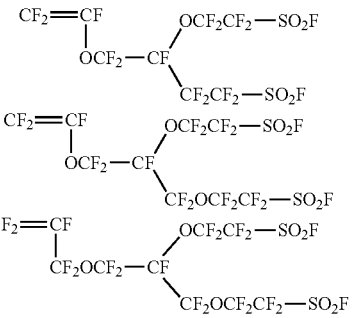

The fluorinated monomer (S') may be used alone or in combination of two or more.

For producing the fluorinated polymer (S'), in addition to the fluorinated olefin and the fluorinated monomer (S'), other monomer may further be used. As other monomer, the above-described monomers may be mentioned.

The content of the units based on other monomer is preferably at most 30 mass % to all the units in the fluorinated polymer (S') with a view to maintaining the ion exchange capacity.

[Pellets]

The pellets of the present invention (hereinafter sometimes referred to as the present pellets) contain a fluorinated polymer having groups convertible to ion exchange groups (fluorinated polymer (I')) such that when the groups convertible to ion exchange groups of the fluorinated polymer (I') are converted to ion exchange groups, the resulting fluorinated polymer (fluorinated polymer (I)) has an ion exchange capacity of at least 1.1 meq/g resin, and the pellets have a light transmittance of from 30 to 60%.

By using the present pellets, an ion exchange membrane excellent in stability of the electrolysis voltage can be formed. The reason has not yet been clearly understood in detail but is estimated as follows.

One of the causes of the deviation in the electrolysis voltage may be non-uniformity of the membrane thickness of the ion exchange membrane. Such non-uniformity of the membrane thickness of the ion exchange membrane is considered to be due to aggregation of pellets of the fluorinated polymer, in production of a film-form ion exchange membrane using the pellets, thus increasing a pressure variation at the time of film formation. Further, the aggregation of the pellets is remarkable when a fluorinated polymer capable of being converted to a fluorinated polymer having a high ion exchange capacity by converting the groups convertible to ion exchange groups to ion exchange groups, is used as the raw material.

The present pellets having a light transmittance within the above range are estimated to have a roughened surface. It is considered that the contact area between the pellets thereby becomes small, and aggregation of the pellets is suppressed. Accordingly, the pressure variation at the time of film formation is suppressed, whereby an ion exchange membrane excellent in the uniformity of the membrane thickness is obtained, and the deviation in the electrolysis voltage can be suppressed when such an ion exchange membrane is applied to an electrolysis apparatus.

The present pellets have a light transmittance of from 30 to 60%, and in view of more excellent stability of the electrolysis voltage, preferably from 30 to 50%, particularly preferably from 30 to 40%.

The light transmittance of the present pellets means a visible light transmittance (measurement wavelength: 400 to 700 nm) measured by a luminous transmissometer (MODEL 304 manufactured by Asahi Spectra Co., Ltd. or an apparatus in accordance therewith), and its specific measurement method is as follows.

First, the luminous transmissometer is adjusted so that the visible light transmittance will be 100% in a state where the after-described sample holder is not placed on a sample table of the luminous transmissometer. Then, a sample holder having a hole with a predetermined size (for example, a rectangular hole of from 2 to 3 mm in length and from 2 to 3 mm in width) to which a pellet is to be inserted, is placed on the sample table, and the light intensity is adjusted so that the visible light transmittance before a pellet is inserted to the hole of the sample holder will be 25%.

Then, a pellet of the same size as the hole of the sample holder is inserted to the hole of the sample holder, and the visible light transmittance is measured. Measurement of the visible light transmittance of the pellet is conducted at several points on one pellet, and the arithmetic mean is obtained. For example, in a case where a cylindrical pellet is used, the pellet is inserted to the hole of the sample holder so that light is applied to the side surface of the pellet, and the visible light transmittance is measured at three points on one pellet while the pellet is rotated every 90 degrees in a circumferential direction, and the arithmetic mean is obtained.

And, the visible light transmittance of the pellet based on the visible light transmittance (25%) before the pellet is inserted to the hole of the sample holder being 100% (that is, 4 times the visible light transmittance of the pellet measured) is calculated and taken as the light transmittance (%) of the present pellets.

The fluorinated polymer (I') contained in the present pellets is the same as the fluorinated polymer (I') used in the above present production method, and the preferred embodiments of e.g. the ion exchange capacity are also the same.

The shape, size, surface state, application, etc. of the present pellets are also the same as those of the pellets obtained by the above present production method.

The present pellets are produced preferably by the above present production method, whereby the light transmittance can easily be adjusted to be within the above range.

[Ion Exchange Membrane]

The ion exchange membrane of the present invention (hereinafter sometimes referred to as the present ion exchange membrane) is produced by using the above present pellets.

As an example of a preferred method for producing the present ion exchange membrane, a method may be mentioned in which a precursor membrane containing the above fluorinated polymer having groups convertible to ion exchange groups (fluorinated polymer (I')) is formed by using the present pellets, and then the groups convertible to ion exchange groups contained in the precursor membrane are converted to ion exchange groups to obtain the present ion exchange membrane containing a fluorinated polymer having ion exchange groups (fluorinated polymer (I)).

[Method for Producing Precursor Membrane]

As the method for producing the precursor membrane, extrusion method may be mentioned. Specifically, the present pellets are supplied to a known melt-extruder for film production and the melt of the present pellets is extruded from a nozzle (such as a T die) of the melt-extruder and formed into a film form thereby to obtain a precursor membrane. The melt temperature of the present pellets is preferably from 150 to 350° C., particularly preferably from 200 to 300° C.

In the precursor membrane, a reinforcing material may be embedded. The reinforcing material may be embedded in the precursor membrane by a known method. For example, in a case where a multi-layered ion exchange membrane is to be formed, a method of sandwiching the reinforcing material between the precursor membrane may be mentioned. Further, the reinforcing material may be embedded in the precursor membrane also by the method of applying the melt of the present pellets to both surfaces of the reinforcing material.

As specific examples of the reinforcing material, a reinforcing fabric (preferably a woven fabric), fibrils and a porous material may be mentioned, and among them, a reinforcing fabric is preferred.

The reinforcing fabric is made of warp and weft, and the woven fabric is preferably made of warp yarns and weft yarns orthogonally woven. The reinforcing fabric is preferably made of reinforcing threads and sacrificial threads.

The reinforcing threads are threads made of materials which will not dissolve in an aqueous alkaline solution. The reinforcing threads are preferably made of at least one material selected from polyterafluoroethylenes, polyphenylene sulfides, nylons and polypropylenes.

The sacrificial threads may be monofilaments or may be multi-filaments composed of two or more filaments.

While the sacrificial threads impart strength to the ion exchange membrane when it is being produced or handled to be installed in an apparatus, they dissolve in an operating apparatus, and thereby lower the resistance of the ion exchange membrane.

[Method for Producing Ion Exchange Membrane]

The present ion exchange membrane containing the fluorinated polymer (I) is obtained by converting the groups convertible to ion exchange groups of the fluorinated polymer (I') in the precursor membrane to ion exchange groups.

The conversion of the groups convertible to ion exchange groups in the precursor membrane to ion exchange groups may be carried out, specifically for example, by subjecting the precursor membrane to hydrolysis treatment or conversion to acid form.

The conversion is carried out preferably by contacting the precursor membrane with an aqueous alkaline solution.

Contact of the precursor membrane with an aqueous alkaline solution may be made, for example, by immersing the precursor membrane in the aqueous alkaline solution or by spraying the aqueous alkaline solution onto the surface of the precursor membrane.

The temperature of the aqueous alkaline solution is preferably at least 30° C. and less than 100° C. from the viewpoint of productivity of the ion exchange membrane, and the duration of the contact between the precursor membrane and the aqueous alkaline solution is preferably from 3 to 300 minutes.

The aqueous alkaline solution preferably comprises an alkali metal hydroxide, a water-miscible organic solvent and water. Specific examples of the alkali metal hydroxide are sodium hydroxide and potassium hydroxide, and potassium hydroxide is preferred. The alkali metal hydroxide may be used alone or in combination of two or more.

In this specification, the water-miscible organic solvent is an organic solvent which easily dissolves in water, and specifically, preferred is an organic solvent with a solubility of at least 0.1 g in 1,000 ml of water (20° C.), and more preferred is an organic solvent with a solubility of at least 0.5 g. The water-miscible organic solvent preferably contains at least one member selected from the group consisting of aprotic organic solvents, alcohols and amino alcohols, and more preferably contains an aprotic organic solvent. The water-miscible organic solvent may be used alone or in combination of two or more.

Specific examples of the aprotic organic solvents include dimethyl sulfoxide, N,N-dimethylformamide, N,N-dimethylacetamide, N-methyl-2-pyrrolidone and N-ethyl-2-pyrrolidone, and dimethyl sulfoxide is preferred.

Specific examples of the alcohols include methanol, ethanol, isopropanol, butanol, methoxyethoxyethanol, butoxyethanol, butyl carbitol, hexyloxyethanol, octanol, 1-methoxy-2-propanol and ethylene glycol.

Specific examples of the amino alcohols include ethanolamine, N-methylethanolamine, N-ethylethanolamine, 1-amino-2-propanol, 1-amino-3-propanol, 2-aminoethoxyethanol, 2-aminothioethoxyethanol and 2-amino-2-methyl-1-propanol.

The content of the alkali metal hydroxide in the aqueous alkaline solution is preferably from 1 to 60 mass %. The content of the water-miscible organic solvent in the aqueous alkaline solution is preferably from 1 to 60 mass %.

When the contents of the alkali metal hydroxide and the water-miscible organic solvent are within the above ranges, the hydrolysis treatment will rapidly be completed, and the productivity of the present ion exchange membrane will improve.

The water content in the aqueous alkaline solution is preferably from 39 to 80 mass %.

After the contact of the precursor membrane with an aqueous alkaline solution, the aqueous alkaline solution may be removed. The aqueous alkaline solution may be removed, for example, by washing the present ion exchange membrane which have been contacted with the aqueous alkaline solution with water.

After the contact of the precursor membrane with an aqueous alkaline solution, the resulting ion exchange membrane may be dried, preferably by heating, preferably at a heating temperature of from 50 to 160° C., preferably for a heating time of from 0.1 to 24 hours.

After the groups convertible to ion exchange groups in the precursor membrane are converted to ion exchange groups, the present ion exchange membrane may be brought into contact with an aqueous solution containing potassium ions, sodium ions or hydrogen ions to replace counter ions (cations) of the ion exchange groups. By replacing the cations of the ion exchange groups with the same cations as cations present in the alkaline water, the present ion exchange membrane can be subjected to alkaline water electrolysis in an environment where the replaced cations are present, thus improving the dimensional stability of the present ion exchange membrane.

A hydrophilizing layer may be formed on the surface of the precursor membrane or the present ion exchange membrane. The hydrophilizing layer may be formed on at least one surface of the precursor membrane or the present ion exchange membrane.

As a specific example of the hydrophilizing layer, an inorganic particle layer containing inorganic particles may be mentioned. The inorganic particles preferably have excellent corrosion resistance against acid or alkaline and have hydrophilicity. Specifically, at least one member selected from the group consisting of oxides, nitrides and carbides of Group 4 and Group 14 elements is preferred, at least one member selected from the group consisting of $SiO_2$, $SiC$, $ZrO_2$ and $ZrC$ is more preferred, and $ZrO_2$ is particularly preferred.

The hydrophilizing layer may contain a binder. The binder may be any known binder to be used for a known hydrophilizing layer (gas release layer) and may, for example, be methyl cellulose or a fluorinated polymer having sulfonic acid groups.

As a specific example of the method for forming the hydrophilizing layer, a method of applying a solution containing the inorganic particles and the binder to the precursor membrane or the present ion exchange membrane may be mentioned.

The present ion exchange membrane may be a monolayer or multilayered. The multilayered ion exchange membrane may be produced, for example, by using a precursor membrane obtained by laminating a plurality of layers comprising a fluorinated polymer having groups convertible to ion exchange groups by extrusion.

The membrane thickness of the present ion exchange membrane is, with a view to keeping a certain strength, preferably at least 30 μm, more preferably at least 40 μm, and in view of improving the current efficiency and the voltage efficiency, preferably at most 500 μm, more preferably at most 300 μm, further preferably at most 180 μm.

[Fluorinated Polymer (I)]

The fluorinated polymer (I) is a fluorinated polymer obtained by converting the groups convertible to ion exchange groups in the fluorinated polymer (I') in the precursor membrane to ion exchange groups.

The fluorinated polymer (I) is preferably a fluorinated polymer having carboxylic acid functional groups (hereinafter sometimes referred to as fluorinated polymer (C)) or a fluorinated polymer having sulfonic acid functional groups (hereinafter sometimes referred to as fluorinated polymer (S)), whereby the effects of the present invention will further be obtained.

Now, the respective fluorinated polymers will be described in detail.

(Fluorinated Polymer (C))

The fluorinated polymer (C) is obtained preferably by converting the groups convertible to carboxylic acid functional groups of the fluorinated polymer (C') to carboxylic acid groups.

The fluorinated polymer (C) preferably contains units based on a fluorinated olefin and units based on a monomer having a carboxylic acid functional group and a fluorine atom.

As the fluorinated olefin, the above-described olefins may be mentioned.

The units based on the fluorinated olefin may be a single species or a combination of two or more species.

As the units based on a monomer having a carboxylic acid functional group and a fluorine atom, units represented by the following formula (1C) are preferred.

  Formula (1C):

$M^C$ is a hydrogen atom, an alkali metal or a quaternary ammonium cation.

X, X', p, q, r, s, t and u are as defined for the above formula (1).

As specific examples of the units represented by the formula (1C), the following units may be mentioned, and preferred is a compound wherein p=1, q=0, r=1, s=0 to 1, t=0 to 3 and u=0 to 1.

—[CF$_2$—CF(O—CF$_2$CF$_2$—COOM$^C$)]—

—[CF$_2$—CF(O—CF$_2$CF$_2$CF$_2$—COOM$^C$)]

—[CF$_2$—CF(O—CF$_2$CF$_2$CF$_2$CF$_2$—COOM$^C$)]—,

—[CF$_2$—CF(O—CF$_2$CF$_2$—O—CF$_2$CF$_2$—COOM$^C$)]—,

—[CF$_2$—CF(O—CF$_2$CF$_2$—O—CF$_2$CF$_2$CF$_2$—COOM$^C$)]—

—[CF$_2$—CF(O—CF$_2$CF$_2$—O—CF$_2$CF$_2$CF$_2$CF$_2$—COOM$^C$)]—,

—[CF$_2$—CF(O—CF$_2$CF$_2$CF$_2$—O—CF$_2$CF$_2$—COOM$^C$)]—

—[CF$_2$—CF(O—CF$_2$CF(CF$_3$)—O—CF$_2$CF$_2$—COOM$^C$)]—

—[CF$_2$—CF(O—CF$_2$CF(CF$_3$)—O—CF$_2$CF$_2$CF$_2$—COOM$^C$)]—.

The units based on a monomer having a carboxylic acid functional group and a fluorine atom may be a single species or a combination of two or more species.

The fluorinated polymer (C) may contain units based on other monomer, other than the units based on a fluorinated olefin and the units based on a monomer having a carboxylic acid functional group and a fluorine atom.

As specific examples of other monomer, the above-described monomers may be mentioned. The content of the units based on other monomer is preferably at most 30 mass % to all the units in the fluorinated polymer (C), with a view to maintaining the ion exchange performance.

(Fluorinated Polymer (S))

The fluorinated polymer (S) is preferably obtained by converting the groups convertible to sulfonic acid functional groups of the fluorinated polymer (S') to sulfonic acid groups.

The fluorinated polymer (S) preferably contains units based on a fluorinated olefin and units based on a monomer having a sulfonic acid functional group and a fluorine atom.

As the fluorinated olefin, the above-described olefin may be mentioned.

The units based on the fluorinated olefin may be a single species or a combination of two or more species.

The units based on a monomer having a sulfonic acid functional group and a fluorine atom are preferably units represented by the formula (2S).

—[CF$_2$—CF(-L-(SO$_3$M$^S$)$_n$)]-     Formula (2S):

In the formula (2S), L and n are as defined for the formula (2).

M$^S$ is a hydrogen atom, an alkali metal or a quaternary ammonium cation.

The units represented by the formula (2S) are preferably units represented by the formula (2S-1), units represented by the formula (2S-2) or units represented by the formula (2S-3).

—[CF$_2$—CF(—O—R$^{f1}$—SO$_3$M$^S$)]—     Formula (2S-1):

—[CF$_2$—CF(—R$^{f1}$—SO$_3$M$^S$)]—     Formula (2S-2):

Formula (2S-3):

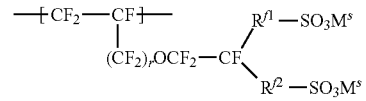

In the formulae (2S-1) to (2S-3), R$^{f1}$, R$^{f2}$ and r are as defined for the formulae (2-1) to (2-3).

M$^S$ is a hydrogen atom, an alkali meta or a quaternary ammonium cation.

As specific examples of the units represented by the formula (2S-1), the following units may be mentioned. In the formulae, w is an integer of from 1 to 8, and x is an integer of from 1 to 5, and M$^S$ is as defined above.

—[CF$_2$—CF(—O—(CF$_2$)$_w$—SO$_3$M$^S$)]—

—[CF$_2$—CF(—O—CF$_2$CF(CF$_3$)—O—(CF$_2$)$_w$—SO$_3$M$^S$)]—

—[CF$_2$—CF(—(O—CF$_2$CF(CF$_3$))$_x$—SO$_3$M$^S$)]—

As specific examples of the units represented by the formula (2S-2), the following units may be mentioned. In the formulae, w is an integer of from 1 to 8, and M$^S$ is as defined above.

—[CF$_2$—CF(—(CF$_2$)$_w$—SO$_3$M$^S$)]—

—[CF$_2$—CF(—CF$_2$—O—(CF$_2$)$_w$—SO$_3$M$^S$)]—

The units represented by the formula (2S-3) are preferably units represented by the formula (2S-3-1). In the formula, M$^S$ is as defined above.

Formula (2S-3-1):

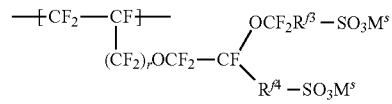

In the formula (2S-3-1), R$^{f3}$, R$^{f4}$ and r are as defined for the formula (2-3-1). M$^S$ is as defined above.

As specific examples of the units represented by the formula (2S-3), the following may be mentioned.

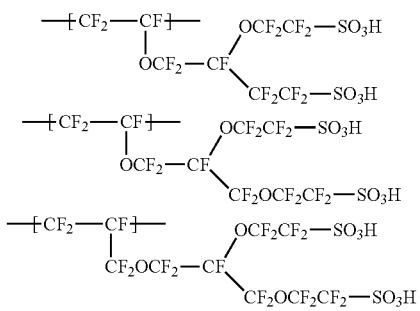

The units based on a monomer having a sulfonic acid functional group and a fluorine atom may be a single species or a combination of two or more species.

The fluorinated polymer (S) may contain units based on other monomer, other than the units based on a fluorinated olefin and the units based on a monomer having a sulfonic acid functional group and a fluorine atom.

As specific examples of other monomer, the above-described monomers may be mentioned. The content of the units based on other monomer is preferably at most 30 mass % to all the monomers in the fluorinated polymer (S) with a view to maintaining the ion exchange capacity.

[Application of Ion Exchange Membrane]

As specific examples of the application of the present ion exchange membrane, various batteries such as a polymer electrolyte fuel cell, a direct methanol fuel cell, a redox flow cell and an air battery, polymer electrolyte water electrolysis, alkaline water electrolysis, ozone water electrolysis, salt water electrolysis and organic electrolysis, and electrolyzers for a chloride, oxide and the like, may be mentioned. The present ion exchange membrane may also be used as a separator or a solid electrode in various types of electrochemical cells for selective cation transport at a cell binding portion. Further, the present ion exchange membrane may also be used for e.g. various gas sensors, biosensors, light-emitting devices, optical devices, organic sensors, and for solubilizing carbon nanotubes, actuators, and catalysts.

EXAMPLES

Now, the present invention will be described in further detail with reference to Examples. However, it should be understood that the present invention is not limited to such specific Examples. The blend ratio of the components in the after-described Table is based on mass.

[Membrane Thickness of Ion Exchange Membrane]

The cross section of the ion exchange membrane was observed with an optical microscope and the membrane thickness was obtained by an image analyzer.

[Ion Exchange Capacity of Fluorinated Polymer]

A fluorinated polymer having ion exchange groups was stored for 24 hours in a glove box in which dry nitrogen was made to flow, and the dry mass of the fluorinated polymer was measured. Then, the fluorinated polymer was immersed in 2 mol/L aqueous sodium chloride at 60° C. for 1 hour. The fluorinated polymer was washed with ultrapure water and taken out, and the solution in which the fluorinated polymer had been immersed was titrated with 0.1 mol/L aqueous sodium hydroxide, and the ion exchange capacity (meq/g resin) of the fluorinated polymer was obtained.

[Light Transmittance of Pellets]

First, a luminous transmissometer (manufactured by Asahi Spectra Co., Ltd., TLV-304-BP) was adjusted so that the visible light transmittance (measurement wavelength: 400 to 700 nm) would be 100% in a state where the after-described sample holder was not placed on a sample table of the luminous transmissometer.

Then, a sample holder (thickness: 0.7 mm) having a rectangular hole (size: from 2 to 3 mm in length and from 2 to 3 mm in width) to which a pellet would be inserted, was placed on the sample table, and the light intensity was adjusted so that the visible light transmittance before a pellet was inserted to the hole of the sample holder would be 25%.

Then, a pellet having substantially the same size as the hole of the sample holder (cylindrical with a diameter of 2 to 3 mm and a length of 2 to 3 mm) was inserted to the hole of the sample holder so that light was applied to the side surface of the pellet, and the visible light transmittance was measured at three points on one pellet while the pellet was rotated every 90 degrees in a circumferential direction, and the arithmetic mean was obtained.

And, the visible light transmittance of the pellet based on the visible light transmittance (25%) before the pellet was inserted to the hole of the sample holder being 100% (that is, 4 times the visible light transmittance of the pellet measured) was calculated and taken as the light transmittance (%) of the pellet.

[Bridging in Hopper]

Whether bridging occurred or not was confirmed, the bridging being such a phenomenon that when the pellets were supplied to the hopper of a melt-extruder for film production to produce a film-form ion exchange membrane (precursor membrane), the pellets aggregated each other in the hopper, thus inhibiting supply of the pellets to a screw portion (a portion for melt-kneading the pellets) connected to the hopper.

Specifically, using a melt-extruder (single screw, screw diameter: 30 mm), a film (T die width: 350 mm) was produced continuously for 3 hours at a pellet melting temperature of 260° C., and whether bridging occurred in the hopper or not was confirmed.

[Film Forming Pressure Variation]

Using a melt-extruder (single screw, screw diameter: 30 mm), a film (T die width: 350 mm) was produced continuously for 3 hours at a pellet melting temperature of 260° C., and the film forming pressure was measured every 30 minutes during a period between immediately after start of operation (0 hour) and completion of the operation (3 hours), and the film forming pressure variation (%) was calculated in accordance with the following formula. The smaller the forming pressure variation, the more excellent the thickness uniformity of the obtainable film, such being preferred.

The film forming pressure was measured by a resin pressure sensor ("CZ-200P" manufactured by RKC INSTRUMENT INC.) installed at the tip of the screw.

Film forming pressure variation (%)=[3−/(arithmetic mean of the film forming pressures at the respective times)]×100 wherein σ is the standard deviation of the film forming pressures measured at the respective times.

[Electrolysis Voltage Variation]

The ion exchange membrane was disposed in a test electrolyzer having an effective conducting area of 1.5 dm$^2$ (electrolysis plane size of 150 mm×100 mm). In the electrolyzer, titanium punched metal (minor axis: 4 mm, major axis: 8 mm) covered with a solid-solution of ruthenium oxide, iridium oxide and titanium oxide as an anode, and SUS304 punched metal (minor axis: 5 mm, major axis: 10 mm) having ruthenium-containing Raney nickel electrodeposited as a cathode, were disposed so that the electrodes and the ion exchange membrane were in direct contact without any gap.

While the sodium hydroxide concentration discharged from the cathode chamber was adjusted to be 32 mass % and the sodium chloride concentration supplied to the anode chamber 200 g/L, electrolysis of aqueous sodium chloride was conducted at a temperature of 90° C. at a current density of 6 kA/m$^2$, and the electrolysis voltage (V) 3 days after start of the operation was measured.

The electrolysis voltage was measured with respect to 10 ion exchange membranes, and the electrolysis voltage variation was calculated in accordance with the following formula. It is considered that the smaller the electrolysis voltage variation, the more excellent the stability of the electrolysis voltage.

Electrolysis voltage variation (%)=[{(maximum electrolysis voltage)−(minimum electrolysis voltage)}/(average electrolysis voltage)]×100

[Production of Fluorinated Polymer (S'-1)]

$CF_2$=$CF_2$ and monomer (X1) represented by the following formula (X1) were copolymerized to obtain fluorinated polymer (S'-1) (ion exchange capacity: 1.1 meq/g resin). The blend ratio of the monomers was adjusted so that the ion exchange capacity of the fluorinated polymer (S'-1) was as mentioned above.

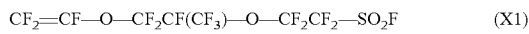

$$CF_2=CF-O-CF_2CF(CF_3)-O-CF_2CF_2-SO_2F \quad (X1)$$

[Production of Fluorinated Polymer (S'-2)]

$CF_2$=$CF_2$ and monomer (X1) represented by the formula (X1) are copolymerized to obtain fluorinated polymer (S'-2) (ion exchange capacity: 1.25 meq/g resin). The blend ratio of the monomers was adjusted so that the ion exchange capacity of the fluorinated polymer (S'-2) was as mentioned above.

[Production of Fluorinated Polymer (S'-3)]

$CF_2$=$CF_2$ and monomer (X2) represented by the following formula (X2) are copolymerized to obtain fluorinated polymer (S'-3) (ion exchange capacity: 1.90 meq/g resin). The blend ratio of the monomers was adjusted so that the ion exchange capacity of the fluorinated polymer (S'-3) was as mentioned above.

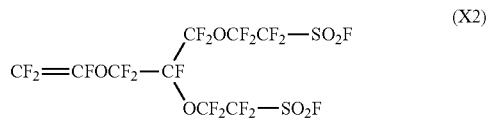

$$CF_2=CFOCF_2-CF\begin{matrix}CF_2OCF_2CF_2-SO_2F\\OCF_2CF_2-SO_2F\end{matrix} \quad (X2)$$

[Production of Fluorinated Polymer (C'-1)]

$CF_2$=$CF_2$ and monomer (Y1) represented by the following formula (Y1) are copolymerized to obtain fluorinated polymer (C'-1) (ion exchange capacity: 1.05 meq/g resin). The blend ratio of the monomers was adjusted so that the ion exchange capacity of the fluorinated polymer (C'-1) was as mentioned above.

$$CF_2=CF-O-CF_2CF_2CF_2-COOCH_3 \quad (Y1)$$

The ion exchange capacities shown in the above [Production of fluorinated polymer (S'-1)] to [Production of fluorinated polymer (S'-3)] and [Production of fluorinated polymer (C'-1)] are ion exchange capacities of fluorinated polymers having ion exchange groups obtained by treating the fluorinated polymers (S'-1) to (S'-3) and (C'-1) as follows. First, each fluorinated polymer having groups convertible to ion exchange groups which had been subjected to heat treatment in vacuum at 240° C. under −0.1 MPaG for 16 hours was immersed in a solution of dimethyl sulfoxide/potassium hydroxide/water=30/5.5/64.5 (mass ratio) at 95° C. for 30 minutes to hydrolyze and convert the groups convertible to ion exchange groups in the fluorinated polymer to K form ion exchange groups, and washed with water. Then, the polymer was immersed in aqueous sodium hydroxide to convert the terminal groups from K form to Na form to obtain a fluorinated polymer having ion exchange groups for ion exchange capacity measurement.

Example 1

The fluorinated polymer (S'-1) was supplied to a melt-extruder for pellet production, and a melt of the fluorinated polymer (S'-1) was obtained. The obtained melt was extruded from a die heated to 190° C. and cooled to obtain a strand (diameter: 3.0 mm). Then, the strand was cut into a length of 3.0 mm to obtain pellets of the fluorinated polymer (S'-1). With respect to the obtained pellets, the above-described various measurements were conducted.

Then, the pellets of the fluorinated polymer (S'-1) were supplied to a melt-extruder for film production and melted at 260° C. to obtain a melt of the pellets of the fluorinated polymer (S'-1). The obtained melt was extruded from a T die and formed into a film to obtain a precursor membrane comprising the fluorinated polymer (S'-1).

In a solution of dimethyl sulfoxide/potassium hydroxide/water=30/5.5/64.5 (mass ratio), the precursor membrane was immersed at 95° C. for 30 minutes to hydrolyze and convert the groups convertible to sulfonic acid functional groups in the precursor membrane to K type sulfonic acid functional groups, and the membrane was washed with water. Then, the membrane was dipped in aqueous sodium hydroxide to convert the terminal groups from K form to Na form, and dried to obtain an ion exchange membrane having a membrane thickness of 30 μm. With respect to the obtained ion exchange membrane, the above various measurements were conducted.

Examples 2 to 8, Comparative Examples 1 to 4

Pellets and an ion exchange membrane were prepared, and various measurements were conducted in the same manner as in Example 1 except that at least one of the type of the fluorinated polymer for pellet production and the die temperature at the time of producing pellets was changed as identified in Table 1. The results of the measurements are shown in Table 1.

TABLE 1

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Fluorinated polymer for producing pellets | S'-1 | S'-1 | S'-2 | S'-2 | S'-2 | S'-3 | S'-3 | C'-1 |
| Ion exchange capacity of fluorinated polymer having ion exchange groups (meq/g dry resin) | 1.10 | 1.10 | 1.25 | 1.25 | 1.25 | 1.90 | 1.90 | 1.10 |
| Die temperature (° C.) | 190 | 140 | 190 | 160 | 140 | 190 | 160 | 195 |
| Pellet light transmittance (%) | 54 | 34 | 57 | 43 | 36 | 59 | 41 | 60 |
| Bridging in hopper | Nil | Nil | Nil | Nil | Nil | Nil | Nil | Nil |
| Film forming pressure variation (%) | 14 | 10 | 15 | 13 | 10 | 16 | 11 | 5 |
| Electrolysis voltage variation (%) | 0.85 | 0.61 | 0.91 | 0.80 | 0.59 | 1.01 | 0.71 | 0.09 |

| | Comp. Ex. 1 | Comp. Ex. 2 | Comp. Ex. 3 | Comp. Ex. 4 |
|---|---|---|---|---|
| Fluorinated polymer for producing pellets | S'-1 | S'-2 | S'-3 | C'-1 |

TABLE 1-continued

| | | | | |
|---|---|---|---|---|
| Ion exchange capacity of fluorinated polymer having ion exchange groups (meq/g dry resin) | 1.10 | 1.25 | 1.90 | 1.05 |
| Die temperature (° C.) | 200 | 220 | 220 | 240 |
| Pellet light transmittance (%) | 62 | 65 | 67 | 68 |
| Bridging in hopper | Observed | Observed | Observed | Observed |
| Film forming pressure variation (%) | 45 | 53 | 40 | 44 |
| Electrolysis voltage variation (%) | 2.78 | 3.27 | 2.48 | 1.80 |

As shown in Table 1, it was found that an ion exchange membrane excellent in stability of the electrolysis voltage was obtained when the die temperature at the time of producing the pellets was less than 200° C. in production of the pellets using a fluorinated polymer having groups convertible to ion exchange groups such that when the groups convertible to ion exchange groups were converted to ion exchange groups, the ion exchange capacity was at least 1.1 meq/g resin (see Examples).

FIG. 1 is a photograph of the outer appearance of the pellet of the fluorinated polymer (S'-1) in Example 1, taken by a microscope (manufactured by KEYENCE CORPORATION, VHX-900) at a magnification of 30.

As shown in FIG. 1, the pellet was substantially cylindrical and had grooves formed on the side surface. The extending direction of the grooves formed on the side surface was the strand flow direction at the time of producing the pellets.

This application is a continuation of PCT Application No. PCT/JP2019/035752, filed on Sep. 11, 2019, which is based upon and claims the benefit of priority from Japanese Patent Application No. 2018-172344 filed on Sep. 14, 2018. The contents of those applications are incorporated herein by reference in their entireties.

What is claimed is:

1. A method for producing pellets, comprising:
extruding a melt comprising a fluorinated polymer from a die of a melt-extruder to obtain a strand comprising the fluorinated polymer; and
cutting the strand to obtain pellets comprising the fluorinated polymer,
wherein the extruding of the melt is from the die having a temperature of less than 200° C., and the fluorinated polymer has convertible groups which are convertible to ion exchange groups such that the fluorinated polymer has ion exchange capacity of at least 1.1 milliequivalent/g dry resin upon conversion of the convertible groups to ion exchange groups.

2. The method for producing pellets according to claim 1, wherein the cutting of the strand produce the pellets having a light transmittance of from 30 to 60%.

3. The method for producing pellets according to claim 1, wherein the ion exchange capacity of the fluorinated polymer upon conversion of the convertible groups is at most 2.00 milliequivalent/g dry resin.

4. The method for producing pellets according to claim 1, wherein the convertible groups are convertible to carboxylic acid functional groups or sulfonic acid functional groups.

5. The method for producing pellets according to claim 1, wherein the fluorinated polymer is a copolymer of a fluorinated olefin and a monomer of formula (1), $CF_2=CF-(O)_p-(CF_2)_q-(CF_2CFX)_r-(O)_s-(CF_2)_t-(CF_2CFX')_u-A^1$ where X and X are each independently a fluorine atom or a trifluoromethyl group, $A^1$ is a group convertible to a carboxylic acid functional group, p is an integer of 0 or 1, q is an integer of from 0 to 12, r is an integer of from 0 to 3, s is an integer of from 0 or 1, t is an integer of from 0 to 12, and u is an integer of from 0 to 3, provided that $1 \leq p+s$, and $1 \leq r+u$.

6. The method for producing pellets according to claim 1, wherein the fluorinated polymer is a copolymer of a fluorinated olefin and a monomer of formula (2), $CF_2=CF-L-(A)_n$ where L is a n+1 valent perfluorinated hydrocarbon group which may contain an oxygen atom, n is 1 or 2, and A is a group convertible to a sulfonic acid functional group.

7. The method for producing pellets according to claim 6, wherein the monomer of the formula (2) is a compound of formula (2-1), $CF_2=CF-O-R^{f1}-A$, a compound of formula (2-2), $CF_2=CF-R^{f1}-A$, or a compound of formula (2-3),

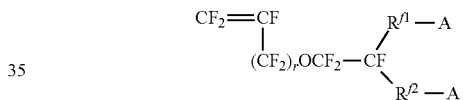

where r is 0 or 1; $R^{f1}$ is a perfluoroalkylene group which may contain an oxygen atom between carbon atoms, $R^{f2}$ is a single bond or a perfluoroalkylene group which may contain an oxygen atom between carbon atoms, and A is as defined for the formula (2).

8. The method for producing pellets according to claim 1, further comprising:
processing the pellets to form an ion-exchange membrane.

9. The method for producing pellets according to claim 1, wherein the temperature of the die when the melt is extruded from the die is at least 140° C.

10. The method for producing pellets according to claim 1, wherein the temperature of the die when the melt is extruded from the die is at most 160° C.

11. The method for producing pellets according to claim 1, wherein the temperature of the die when the melt is extruded from the die is at least 140° C. and at most 150° C.

12. The method for producing pellets according to claim 1, wherein the ion exchange capacity of the fluorinated polymer upon conversion of the convertible groups is at least 1.2 milliequivalent/g dry resin and at most 1.90 milliequivalent/g dry resin.

* * * * *